United States Patent
Mathur et al.

(10) Patent No.: US 10,839,001 B2
(45) Date of Patent: Nov. 17, 2020

(54) ASSET GENEALOGY TRACKING IN DIGITAL EDITING SYSTEMS

(71) Applicant: Avid Technology, Inc., Burlington, MA (US)

(72) Inventors: Shailendra Mathur, Beaconsfield (CA); Roger P. Sacilotto, Jr., Saugus, MA (US)

(73) Assignee: Avid Technology, Inc., Burlington, MA (US)

( * ) Notice: Subject to any disclaimer, the term of this patent is extended or adjusted under 35 U.S.C. 154(b) by 240 days.

(21) Appl. No.: 16/166,285

(22) Filed: Oct. 22, 2018

(65) Prior Publication Data

US 2019/0205399 A1     Jul. 4, 2019

Related U.S. Application Data

(60) Provisional application No. 62/611,904, filed on Dec. 29, 2017.

(51) Int. Cl.
| | |
|---|---|
| *G06F 16/41* | (2019.01) |
| *G11B 27/031* | (2006.01) |
| *G11B 27/28* | (2006.01) |
| *G06F 16/22* | (2019.01) |
| *G06F 21/12* | (2013.01) |

(52) U.S. Cl.
CPC .......... *G06F 16/41* (2019.01); *G06F 16/2246* (2019.01); *G06F 21/12* (2013.01); *G11B 27/031* (2013.01); *G11B 27/28* (2013.01); *G06F 2221/0713* (2013.01)

(58) Field of Classification Search
USPC .................................................. 707/741, 956
See application file for complete search history.

(56) References Cited

U.S. PATENT DOCUMENTS

| | | | |
|---|---|---|---|
| 9,448,789 B2 | 9/2016 | Mathur et al. | |
| 2011/0246892 A1* | 10/2011 | Hedges | G11B 27/034 |
| | | | 715/723 |
| 2015/0220558 A1* | 8/2015 | Snibbe | G11B 27/031 |
| | | | 707/627 |

(Continued)

FOREIGN PATENT DOCUMENTS

EP     2131366     12/2009

*Primary Examiner* — Cam Linh T Nguyen
(74) *Attorney, Agent, or Firm* — Oliver Strimpel

(57) ABSTRACT

Information about each of the media assets that contribute to a published media composition is needed to determine attribution and contractual terms for the composition as a whole. The generation of a hierarchical asset genealogy that includes information about each of the assets that contribute to a media composition provides a mechanism for recording the full asset contribution history of a composition. The information may include asset ownership, distribution rights, asset structure, talent, and editors involved in generating the asset. For time-based compositions, it may specify which portions of an asset contribute to the composition. A report generator generates asset reports from the asset genealogy without the need to access or read the original composition, which may be represented by a proprietary compositional data model corresponding to an editing applications used to create the composition.

19 Claims, 14 Drawing Sheets

(56) References Cited

U.S. PATENT DOCUMENTS

2015/0234564 A1\* 8/2015 Snibbe ................ G11B 27/031
   715/716
2016/0173960 A1\* 6/2016 Snibbe ................ H04N 21/233
   386/285

\* cited by examiner

ASSET GENEALOGY TRACKING IN DIGITAL EDITING SYSTEMS

CROSS REFERENCE TO RELATED APPLICATION

This application claims right of priority to and the benefit under 35 U.S.C. § 119(e) of U.S. provisional patent application Ser. No. 62/611,904, filed Dec. 29, 2017.

BACKGROUND

The creation of all but the simplest of digital compositions involves the incorporation into the composition of numerous assets belonging to many different parties. For example, in a digital media project, the audio may include music from one source, dialog from another, and sound effects from a third. Similarly, video may come from original material as well as from various stock footage suppliers, and special effects may come from further sources. While some of these assets survive the editing process and become incorporated, at least in part, in the final composition, others are eliminated along the way.

It is important to be able to retain a complete genealogy of all the assets that contribute to the final product, even if the assets do not appear in their original form. Such a genealogy may be needed for a variety of purposes, including attribution and for honoring contractual rights, including compensation, or restrictions on distribution. Yet the complexity of the editing process, which may involve many intermediate stages of asset mixing, can make it extremely difficult to capture an accurate and comprehensive genealogy for a finished composition. This challenge is compounded when, as in most cases, original sources of the composition's assets are not retained or distributed with the final composition. As with most editing, even if a source contributes to the final product, a rendering, consolidate, mix-down or export process creates new output assets that have their own identity, and hence do not retain a link to the original sources that contributed to it. Even if the knowledge of original sources is retained in a composition, the information required for the genealogy may be buried in data models that are specific to individual editing tools used in the editing process.

In addition to the genealogy of the assets that are edited into a project using editing tools such as non-linear video editing systems and digital audio workstations, various stake-holders often add custom metadata to assets consumed by a media composition. Custom metadata may also be entered to objects within an edited composition. Tracking such metadata once it has been through the media production pipeline with its variety of editing and finishing tools is challenging. There is therefore a need for reliable and efficient methods of the reporting genealogy of a composition that includes a record of all the assets that contribute to a digitally edited composition together with any custom metadata associated with the assets.

SUMMARY

In general, in the methods, systems, and computer program products described herein, digital editing applications generate asset genealogies that may be exported as part of the distributed compositional end product or rendered results, or as separate documents. The genealogy incorporates information about all assets that contribute to the composition, including those for which a record would traditionally have been lost during rendering and export or during consolidation. An editing application-independent report generator parses an asset genealogy to generate a genealogy report for a composition.

In general, in one aspect, a method of generating a hierarchical asset genealogy of a media composition comprises: accessing the media composition, wherein the media composition is represented by a first plurality of media assets that contribute to the media composition; for each asset of the first plurality of media assets that contribute to the media composition, extracting metadata pertaining to the media asset and writing the extracted metadata into the hierarchical asset genealogy, wherein: at least one previously edited asset of the first plurality of media assets includes metadata pertaining to a second plurality of media assets that contribute to the at least one previously edited asset; and writing the extracted metadata into the hierarchical asset genealogy includes writing the metadata of each asset of the second plurality of media assets into the hierarchical asset genealogy at a level below a level at which metadata pertaining to the at least one previously edited asset of the first plurality of assets is written; and storing the asset genealogy in a memory of the media editing system.

Various embodiments include one or more of the following features. The asset genealogy is serialized and exported to a document file. The document file is in one of a text format and an XML format. A reporting application reads the document file containing the serialized asset genealogy and outputs an asset genealogy report document that includes information derived from a subset of the serialized asset genealogy in accordance with a schema accessed by the reporting application. The media composition is rendered, the hierarchical asset genealogy is serialized, and both the rendered media composition and the serialized asset genealogy are exported from the media editing system to a media file. The metadata pertaining to at least one of the second plurality of media assets does not include a locator that references an essence file, and the at least one of the second plurality of media assets is represented in the asset genealogy as a virtual asset that does not include a locator that references an essence file. The metadata pertaining to at least one of the second plurality of media assets includes a locator that references an essence file, and the at least one of the second plurality of media assets is represented in the asset genealogy as a physical asset that includes the locator that references the essence file. The locator is one of a uniform resource locator and a media asset identifier. At least one of: an asset of the first plurality of assets or an asset of the second plurality of assets includes custom metadata that was added to the asset by a user of the media editing system and extracting and writing metadata of the asset into the hierarchical asset genealogy includes extracting and writing the custom metadata into the hierarchical asset genealogy. The metadata extracted from each of the first plurality of assets and the second plurality of assets includes metadata of a predetermined type, wherein the type is specified by a schema received by the media editing system. The predetermined type includes usage rights for the asset to which the metadata pertains. The predetermined type includes ownership of the asset to which the metadata pertains. A media asset of the first plurality of media assets was captured by a device, and a type of metadata pertaining to the captured media asset was specified by a schema accessed by the device. The media composition is a time-based media composition, and the metadata extracted and written into the hierarchical asset genealogy includes data defining a temporal portion of an asset that contributes to the media composition. The media editing system consolidates the media composition prior to the generation of the hierarchical asset genealogy, the consolidation including: extracting contributing portions of essence referenced by a plurality of assets that contribute to the media composition and writing the extracted portions into a consolidated essence file; and copying into the media composition metadata pertaining to each of the plurality of assets that contribute to the media composition. At least one of the first plurality of media assets and the second plurality of media assets include a procedurally defined graphical object, and the metadata extracted and written into the hierarchical asset genealogy includes data defining a spatial location of the procedurally defined graphical object within the media composition. At least one of the first plurality of media assets and the second plurality of media assets include a software procedural generator. The software procedural generator, when executed by the media composition system, generates at least one of an audio signal, a color value, and a color tone bar.

In general, in another aspect, a computer program product comprises: a non-transitory computer-readable medium with computer program instructions encoded thereon, wherein the computer program instructions, when processed by a media editing system, instruct the media editing system to generate a hierarchical asset genealogy of a media composition, the method comprising: accessing the media composition, wherein the media composition is represented by a first plurality of media assets that contribute to the media composition; for each asset of the first plurality of media assets that contribute to the media composition, extracting metadata pertaining to the media asset and writing the extracted metadata into the hierarchical asset genealogy, wherein: least one previously edited asset of the first plurality of media assets includes metadata pertaining to a second plurality of media assets that contribute to the at least one previously edited asset; and writing the extracted metadata into the hierarchical asset genealogy includes writing the metadata of each asset of the second plurality of media assets into the hierarchical asset genealogy at a level below a level at which metadata pertaining to the at least one previously edited asset of the first plurality of assets is written; and storing the asset genealogy in a memory of the media editing system.

In general, in a further aspect, a media editing system comprises a memory for storing computer-readable instructions; and a processor connected to the memory, wherein the processor, when executing the computer-readable instructions, causes the media editing system to perform a method of generating a hierarchical asset genealogy of a media composition, the method comprising: accessing the media composition, wherein the media composition is represented by a first plurality of media assets that contribute to the media composition; for each asset of the first plurality of media assets that contribute to the media composition, extracting metadata pertaining to the media asset and writing the extracted metadata into the hierarchical asset genealogy, wherein: at least one previously edited asset of the first plurality of media assets includes metadata pertaining to a second plurality of media assets that contribute to the at least one previously edited asset; and writing the extracted metadata into the hierarchical asset genealogy includes writing the metadata of each asset of the second plurality of media assets into the hierarchical asset genealogy at a level below a level at which metadata pertaining to the at least one previously edited asset of the first plurality of assets is written; and storing the asset genealogy in a memory of the media editing system.

DETAILED DESCRIPTION

Time based media projects are typically created using various digital editing and finishing tools. For example, video editing is typically performed using a non-linear digital video editing system, such as Media Composer® from Avid® Technology, Inc. of Burlington, Mass., audio editing is carried out with a digital audio workstation, such as Pro Tools®, also from Avid Technology, Inc., and graphics effects are created and applied with video effects software. Such tools offer the editor the ability to select and combine portions of assets from many distinct sources, and to view the project during the course of editing within a graphical user interface. The asset types may include media assets, such as video clips and audio clips, as well as other types of assets such as procedural graphics generators and image or audio effects generators. In a typical workflow, a first asset may be used as a source of material that is edited into a second asset. The second asset may in turn be used as a source when editing a third asset, and so on. When a composition is rendered in preparation for export, the consumed portions of the source assets, i.e., just the parts of the source assets that contribute to the rendered composition, are included in a new essence file, and the original complete source assets as well as metadata contained within the source assets is no longer retained in association with the rendered composition. The information specifying which portions of the source assets consumed by the rendered composition is also not retained.

Figure 1A:
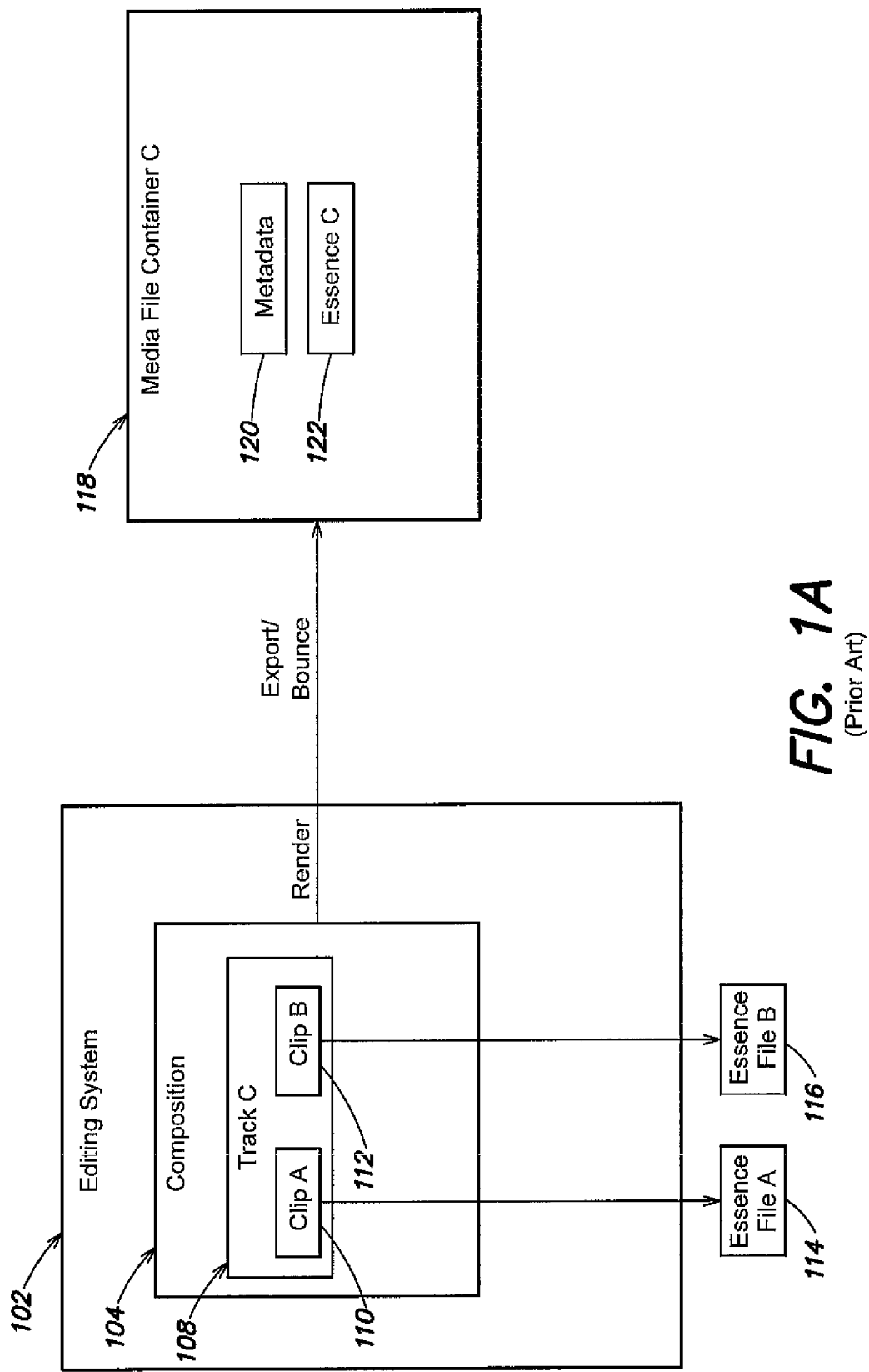
FIG. 1A is a high-level block diagram illustrating prior art export of a media composition from an editing system to a media file.

The process is illustrated in FIG. 1A, in which editing system 102 (e.g., a non-linear video editing system or a digital audio workstation) includes composition 104, which contains Track C 108. Track C, in addition to metadata pertaining to the track, contains Clip A 110 and Clip B 112. Clip A and Clip B, in turn, contain references to their media essence, shown in the figure as Essence File A 114 and Essence File B 116. The essence files are located on local or remote storage. When the composition is output, the editing system renders it and then exports it to media file container 118, which contains metadata section 120 and the media file's essence, shown as Essence C 122. Media File Container C 118 contains no information about source assets Clip A and Clip B, nor about which portions of the source were consumed by the composition.

Figure 1B:
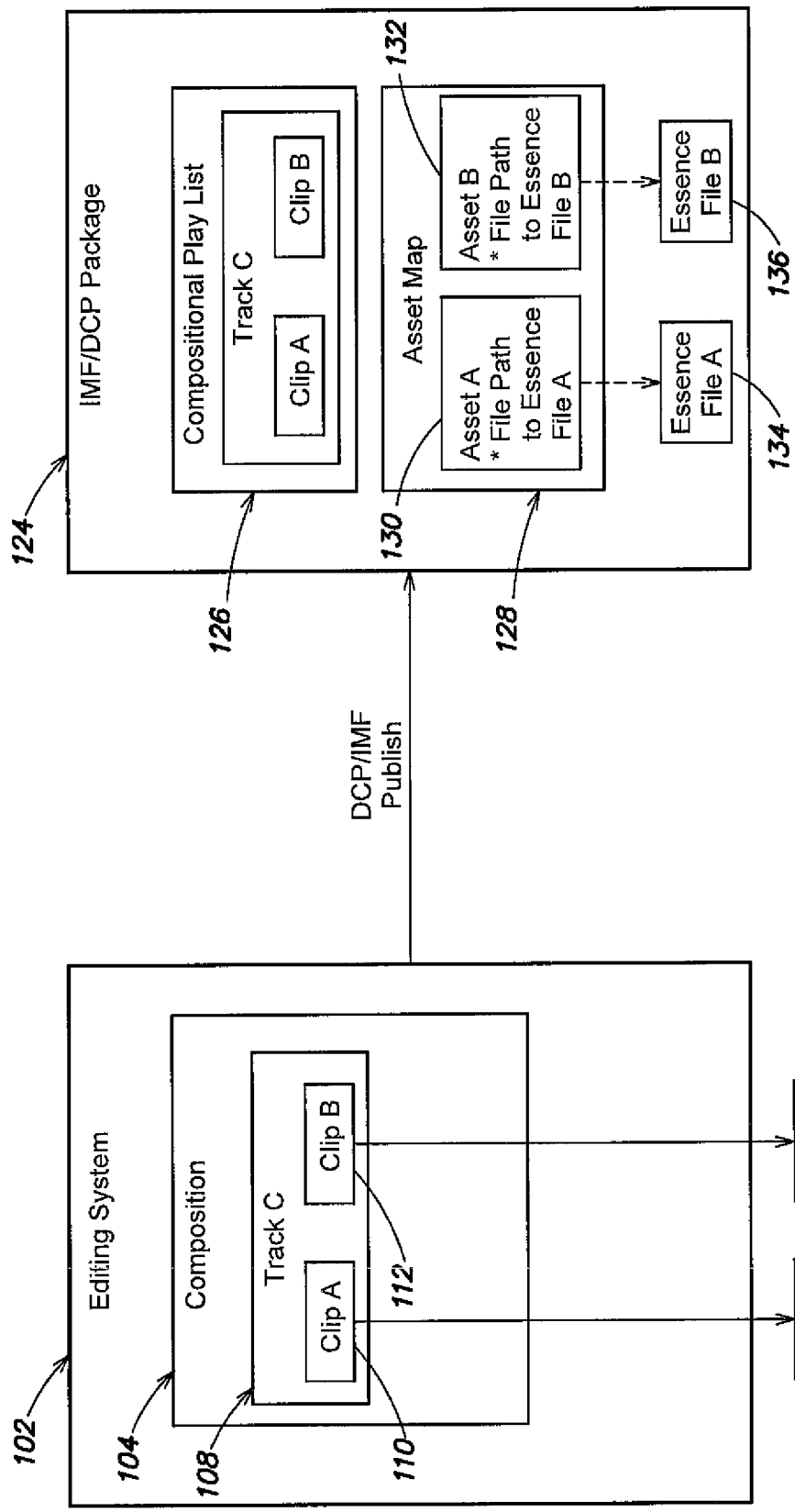
FIG. 1B is a high-level block diagram illustrating prior art publishing of a media composition from an editing system to an Interoperable Master Format/Digital Cinema Package (IMF/DCP) package.

A similar process of rendering and export is illustrated in FIG. 1B, but instead of outputting a media file, interoperable master format or digital cinema package (IMF/DCP) 124 is published. An IMF/DCP is able to represent a composition with one or more tracks, each containing one or more clips. The IMF/DCP package includes compositional playlist (CPL) 126 and asset map 128. The CPL is a listing of the playback order of the assets within the package. The asset map contains file paths 130 and 132 to the essence files for assets 134 and 136 respectively. It is not possible to store descriptive metadata within an IMF/DCP package. Further, the assets (Asset A, Asset B) cannot reference other assets, and thus no information about multiple generations of editing that may have taken place to create Assets A and B can be retained within the package.

The source asset information may already have been lost at an earlier stage of editing during simplification, or consolidation of the composition. Consolidation is performed because maintaining a chain of references for each of the assets consumed in a composition back to its original essence files would become complex, and the bulky original essence files retained would become unwieldy. Thus, it is normal practice for assets of a composition that are derived from one or more source assets to be consolidated into a single composite asset, which then becomes the "atomic" asset for further editing steps. As part of the consolidation, only the portions of the original essence files that are to be consumed by the composition are retained in a newly created consolidated essence file, and the source assets together with the source essence files to which they refer are discarded. In addition, the information describing the source assets and the portions that were consumed by the composition is lost as part of the consolidation process.

Figure 1C:
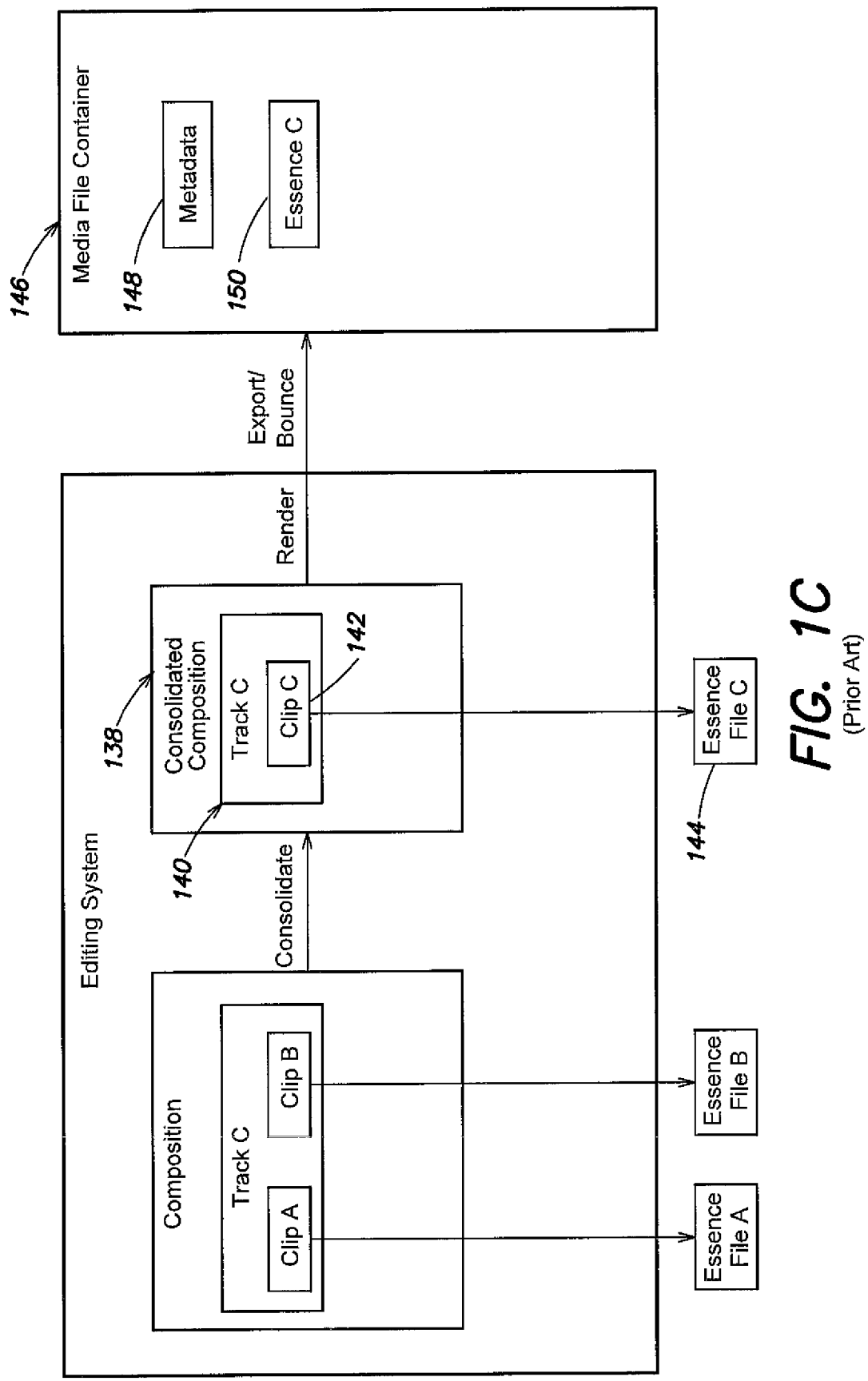
FIG. 1C is a high-level block diagram illustrating prior art consolidation and export of a media composition from an editing system to media file.

FIG. 1C illustrates the export of a media file from an editing system, but this time with a consolidate step taking place within the editing system prior to the export. In FIG. 1C, consolidated composition 138 includes Track C 140, which contains a single asset, Clip C 142 that references Essence File C 144, which includes essence corresponding to the consumed portions of Clip A and Clip B. The metadata pertaining to Clip A and Clip B and the clips' source essence files are no longer included or referenced within the consolidated composition. Rendering and export produces media file container 146 with metadata 148 and Essence C 150.

Figure 1D:
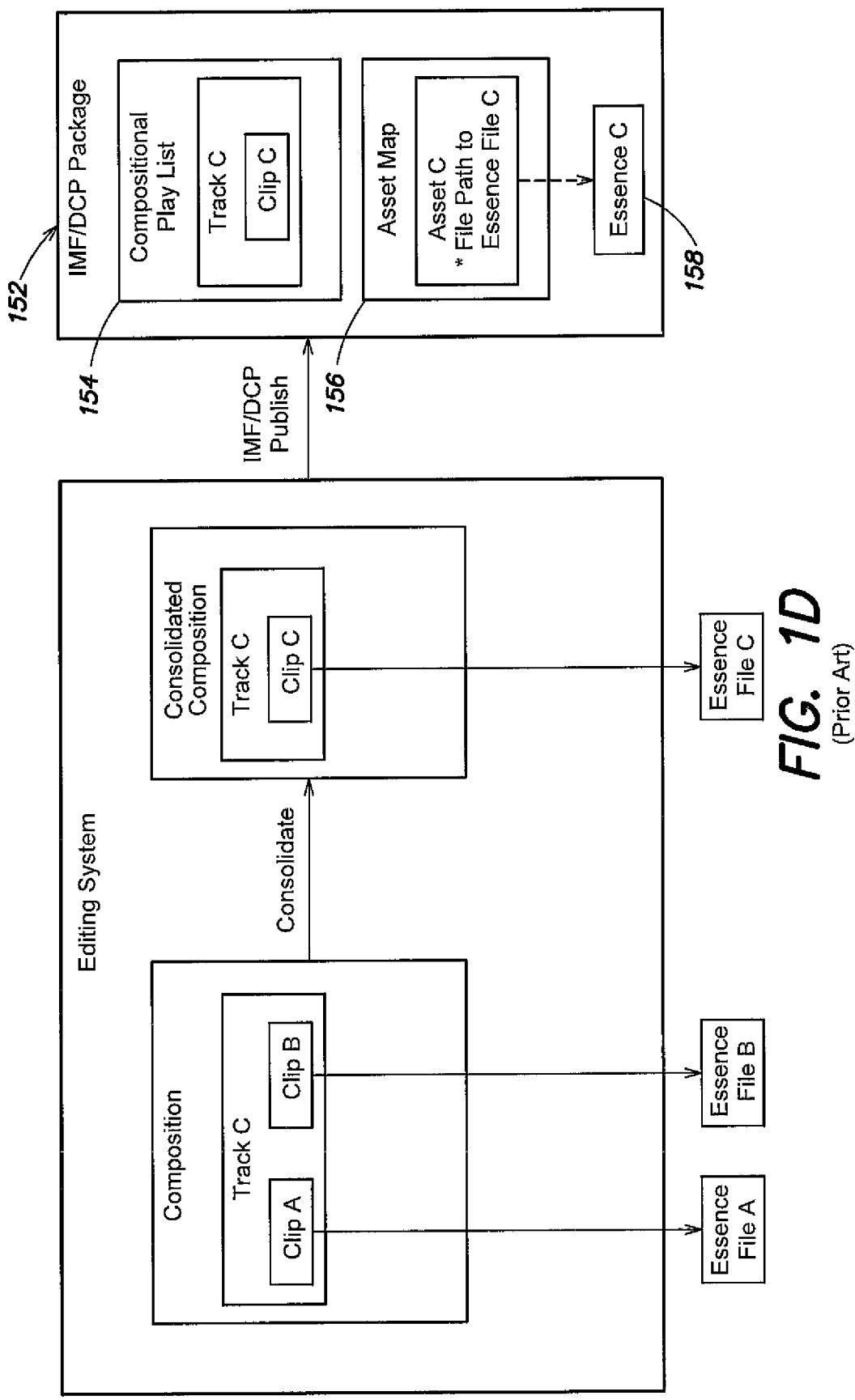
FIG. 1D is a high-level block diagram illustrating prior art consolidation and publishing of a media composition from an editing system to an IMF/DCP package.

An IMF or DCP is able to represent a composition with one or more tracks, each containing one or more clips, i.e., with a compositional playlist containing tracks with their constituent clips. More complex compositional structures cannot be represented in an IMF/DCP compositional playlist, and such compositions must be consolidated and rendered or mixed down to create a composition that is described using a simple track and clip representation. FIG. 1D shows the publishing of IMF/DCP package 152 following consolidation. In this case, IMF/DCP package 152 includes compositional playlist 154 with single Track C containing single Clip C, and asset map 156 includes a single file path to Essence C 158. In an IMF or DCP, neither the compositional playlist nor the asset map include metadata pertaining to source assets that have been consumed within the composition. As indicated above, such information is lost during the render/mix-down that occurs when exporting a composition, or at an earlier point during consolidation of the composition within the editing system.

We describe herein methods for preserving some or all of the metadata pertaining to each of the assets contributing to the composition in a structured form that reflects the editing history of a composition. The metadata is preserved through both the consolidation process, as well as during mixdown/rendering. The particular metadata fields that are preserved may be specified by a schema. The preserved metadata is maintained in structured form within an editing system memory as an asset genealogy in memory and is serialized and exported either together with a published media file containing the composition, or as a separate file.

Figure 2:
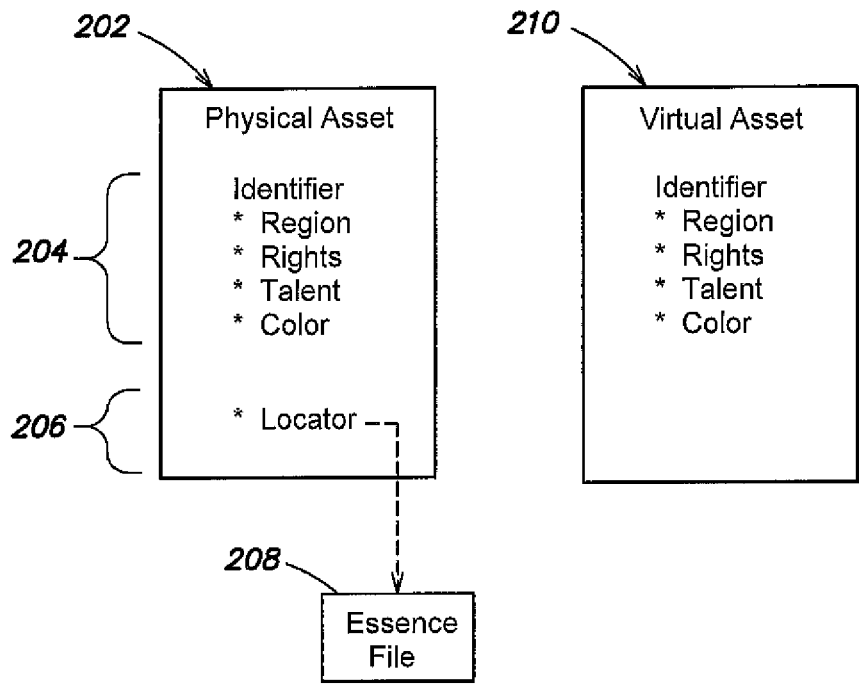
FIG. 2 illustrates the distinction between a physical asset and a virtual asset.

Compilation of an asset genealogy involves the use of conventionally defined assets, referred to herein as physical assets, as well as virtual assets. FIG. 2 illustrates the distinction between a physical asset and a virtual asset. Physical asset 202 includes metadata 204 pertaining to the asset, which contains at a minimum an identifier for the asset (e.g., a name, a unique material identifier, or a link), as well as optionally additional metadata such as a geographical region to which it pertains, usage rights information, talent information (e.g., artists), and color information (e.g., color primaries, color gamma). The physical asset also includes locator 206 that references essence file 208. For a media asset, the essence file is either video essence or audio essence, and in such cases the essence file may interchangeably be referred to herein as a media file. The media file may itself be in a variety of known standard formats such as MXF (.mxf), QuickTime (.mov), and Broadcast Wave (.bwav). For a graphics asset, the essence file may be a procedure, e.g., a model of a sphere or of a three-dimensional box. By contrast, virtual asset 210 includes only the metadata pertaining to the virtual asset, and has no locator or corresponding essence file. A typical asset genealogy is composed of a combination of physical assets and virtual assets.

Figure 3:
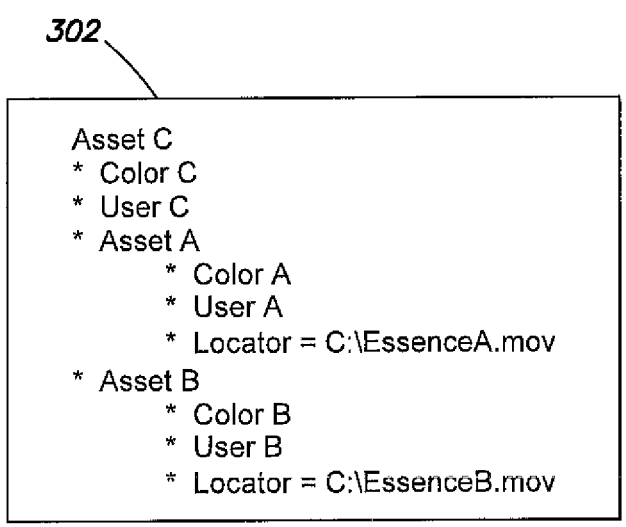
FIG. 3 illustrates an asset genealogy of an asset comprising two contributing assets.

FIG. 3 illustrates a single generation asset genealogy of an asset that includes metadata capturing information about the assets one level below the top-level asset that were used to create the top-level asset. Asset genealogy 302 contains metadata pertaining to top level Asset C, including the identifier of the asset (i.e., Asset C), color parameters of the asset (i.e., Color C), and information about the user who created the asset (User C). It also contains identifiers Asset A and Asset B of the assets that were used to create Asset C. For each of Assets A and B, metadata pertaining to these assets is also contained within the genealogy, i.e., Color A and User A, and Color B and User B. The information pertaining to Assets A and B also includes locators that reference their essence files. Thus, the illustrated genealogy for top-level Asset C includes two physical assets, Asset A and Asset B. The asset genealogy shown is in the form of serialized hierarchy, with the derived asset containing, in addition to its own metadata, the metadata and locators for the two source assets that contributed to it. The asset genealogy may include an arbitrary number of levels, and have a structure reflecting the detailed editing history of a composition that led to the top-level asset within the asset genealogy that represents the edited composition.

The type of metadata associated with an asset in the asset genealogy may be both descriptive and structural. Examples of descriptive metadata include the owner of the asset and the talent responsible for creating it, such as the director, producer, actors, and artists. Examples of structural metadata include details of the encoding scheme, color parameters, contractual obligations such as royalty payments, territory limitations, and venue restrictions. The metadata fields present for each asset within a given asset genealogy may vary from one asset to another.

Since an asset genealogy contains an entry for each of the assets that contribute at least in part to the final composition, it records the complete asset contribution history of the composition. The hierarchical tree structure of the asset genealogy records how each asset contributes to the media file. The asset genealogy thus provides the information that may be used to generate reports detailing various aspects of a media project, including a full listing of the assets that contribute to it.

A composition that is being created by a compositional editing system is represented within the editing system in a native form that adheres to a data model specific to the editing system. For example, a non-linear video editing system represents a video composition using a data model adapted to the video editing process, with means for representing video-related compositional objects. Analogously, a digital audio workstation represents an audio composition using a data model suitable for representing audio compositional objects and audio editing, and a graphic effects editor uses a graphics object-based data model. In addition, non-media digital composition tools, such as word processors for text documents, and spreadsheet applications for workbooks, each have their own data models for fully representing the state of their types of composition and the compositional objects they contain. Compositions of most types are based on linked objects that define how the various elements of the composition are assembled. These objects form a part of a containment hierarchy, with a parent-child relationship between objects. However, each type of compositional editing system may include structures specific to it. For example, time-based media editing systems have data models that contain objects with a temporal dimension. Graphics effects editing systems have data models with objects that have spatial positions within a scene. An asset genealogy may be constructed for any type of composition, including time-based and non-time-based compositions.

To generate an asset genealogy, a composition is traversed from the leaf node assets of the compositional structure up to the top-level asset, and the elements that contribute to the final output are identified. The metadata for each of the identified contributing elements is extracted and placed in the asset genealogy. For certain contributing elements, if locator information for a source asset for these elements is available, it may also be extracted and placed into the asset genealogy.

Figure 4:
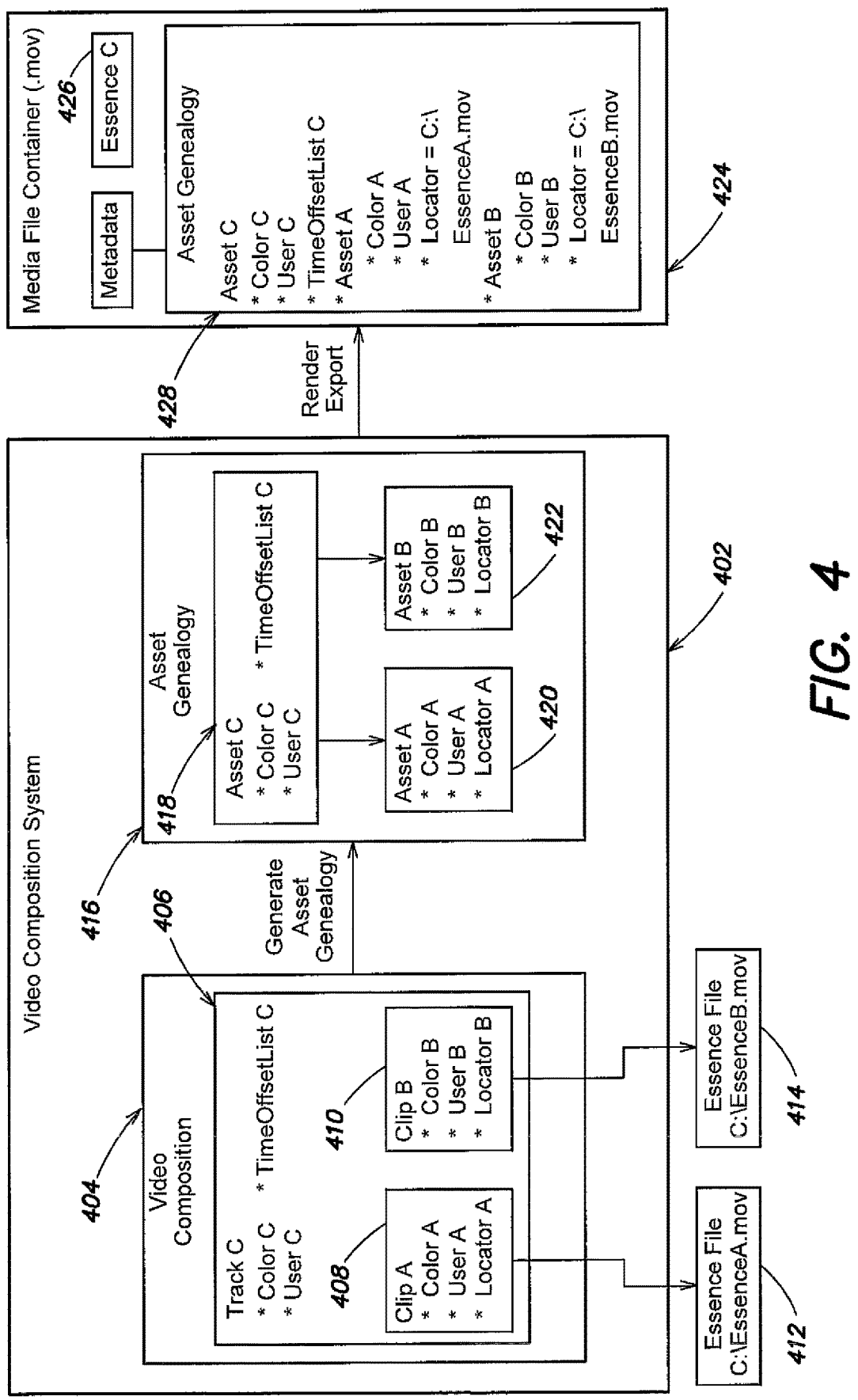
FIG. 4 illustrates the generation and export of an asset genealogy of a video composition along with the rendering and export of the composition to a media file.

We now illustrate the generation of an asset genealogy for two types of compositions—a video composition and a computer-generated graphics composition. FIG. 4 illustrates the process of generating an asset genealogy for a video composition. Video composition 404 is represented in a data model that is specific to video composition system 402. Video composition 404 includes top-level asset Track C 406 that contains two clip objects, Clip A 408 and Clip B 410. Metadata pertaining to Track C includes Color C, User C, and TimeOffsetList C. TimeOffsetList C includes the mark-in and mark-out temporal offsets for the portions of source essence files 412 and 414 that contribute to Clip A and Clip B respectively. Clips A and B include pointers to their respective essence files. When the asset genealogy for video composition 404 is generated, the composition is traversed, and the metadata of each of the contributing compositional objects is extracted and placed into hierarchical asset genealogy 416 within the memory of video composition system 402. Asset genealogy 416 may be represented as a linked list, and in general it has a tree structure. The genealogy includes top-level Asset C 418 (corresponding to Track C), which points to contributing assets Asset A 420 and Asset B 422. Asset A and Asset B are physical assets, each containing locators to corresponding essence files. In existing systems, such locator information is generally discarded after the process of rendering and export is performed.

In the example illustrated in FIG. 4, asset genealogy 416 is generated together with the rendering and export of video composition 404 to media file container 424. The rendering process generates Essence C 426, which is the essence required to play the edited video composition and the export process places the rendered essence into media file container 424. In addition, asset genealogy 416 is serialized and exported along with the essence file and placed in serialized form 428 within media file container 424. All the pertinent metadata pertaining both to top-level Asset C as well as to contributing assets Asset A and Asset B are retained in the genealogy.

Figure 5:
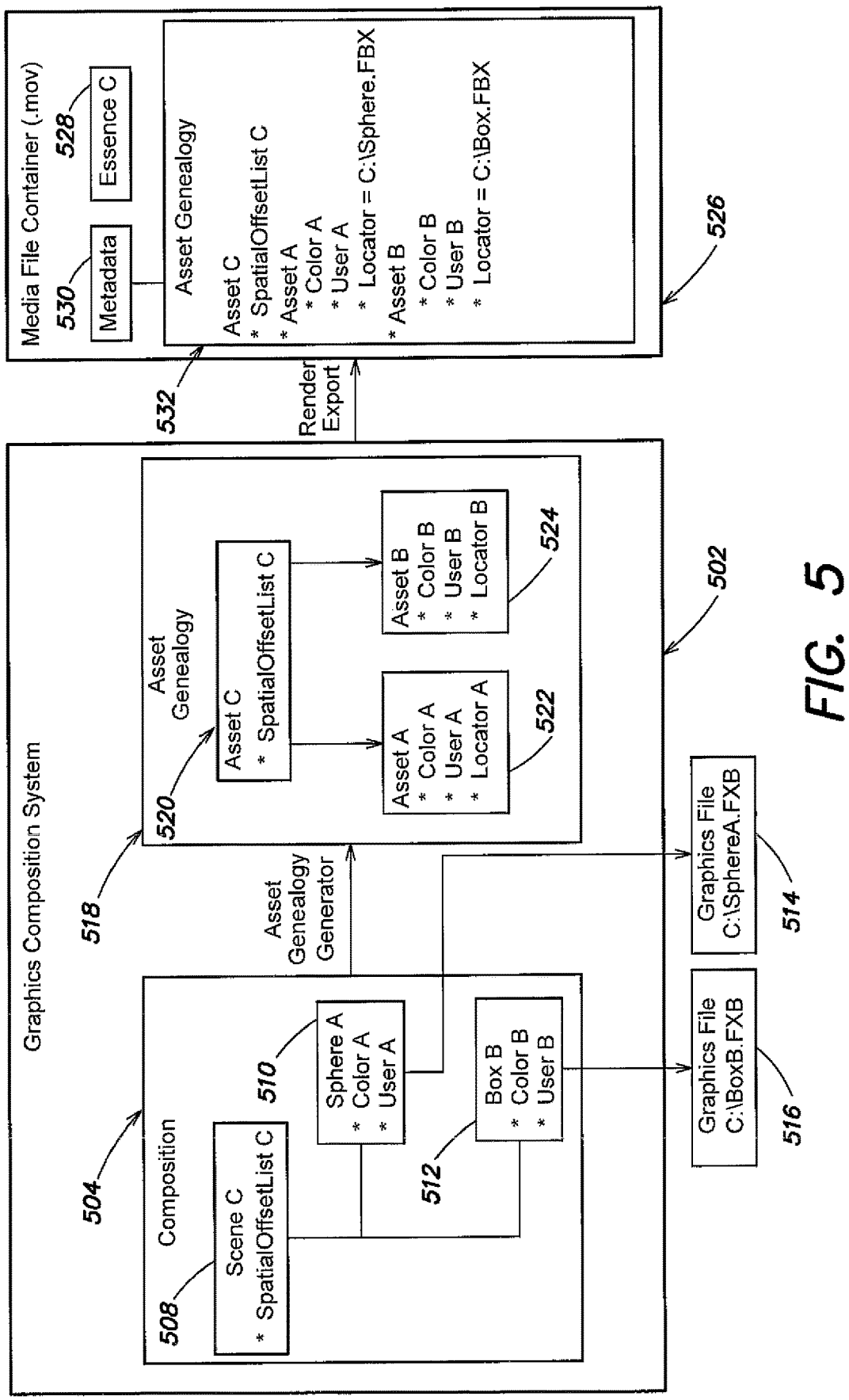
FIG. 5 illustrates the generation and export of an asset genealogy of a graphics composition along with the rendering and export of the composition to a media file.

FIG. 5 illustrates the generation and export of an asset genealogy for a graphics composition system. In graphics composition system 502, composition 504 is represented as a scene graph, and includes a scene containing a sphere object and a box object. The top-level compositional object is Scene C 508, which references Sphere A 510 and Box B 512. The metadata pertaining to Scene C includes SpatialOffsetList C, which defines the three-dimensional positions within the graphics composition of Sphere A and Box B. The metadata in this case is spatial, in contrast to the temporal metadata of time-based media. Sphere A and Box B refer to graphics files SphereA.FBX 514 and BoxB.FBX 516 respectively. The composition is parsed to generate asset genealogy 518, which contains a hierarchical representation of the assets used to create the composition. It includes top-level Asset C 520, which references physical Asset A 522 and physical Asset B 524. Upon rendering and export, media file container 526 is generated that includes, in addition to Essence C 528 generated from rendering Scene C 508, metadata section 530 with serialized asset genealogy 532. The asset genealogy includes metadata for physical assets A and B that contribute to top-level Asset C.

Another type of asset that is used as part of producing a media project is a procedural method for generating a video or an audio element. For example, various image processing algorithms, such as one that generates a blur effect or generates a projection geometry in an image may be used to generate graphic effects. A procedural method may generate a color value or a color tone bar. A tone generator or synthesizer algorithm may be used to generate an audio signal or to process existing audio.

After a procedural method has been applied to generate the corresponding audio or graphics, and the effect incorporated into a mixed-down audio clip or into a rendered video clip, it is no longer required for playing back or for delivering the media project and may thus be discarded in the normal process of media editing and rendering. However, metadata describing and recording the applied procedural method is included within the asset genealogy, optionally storing procedural parameters that were used even if the actual software to rerun the procedure is not retained. As with any of the assets in the asset genealogy, such procedural assets may also include other types of metadata.

Figure 6:
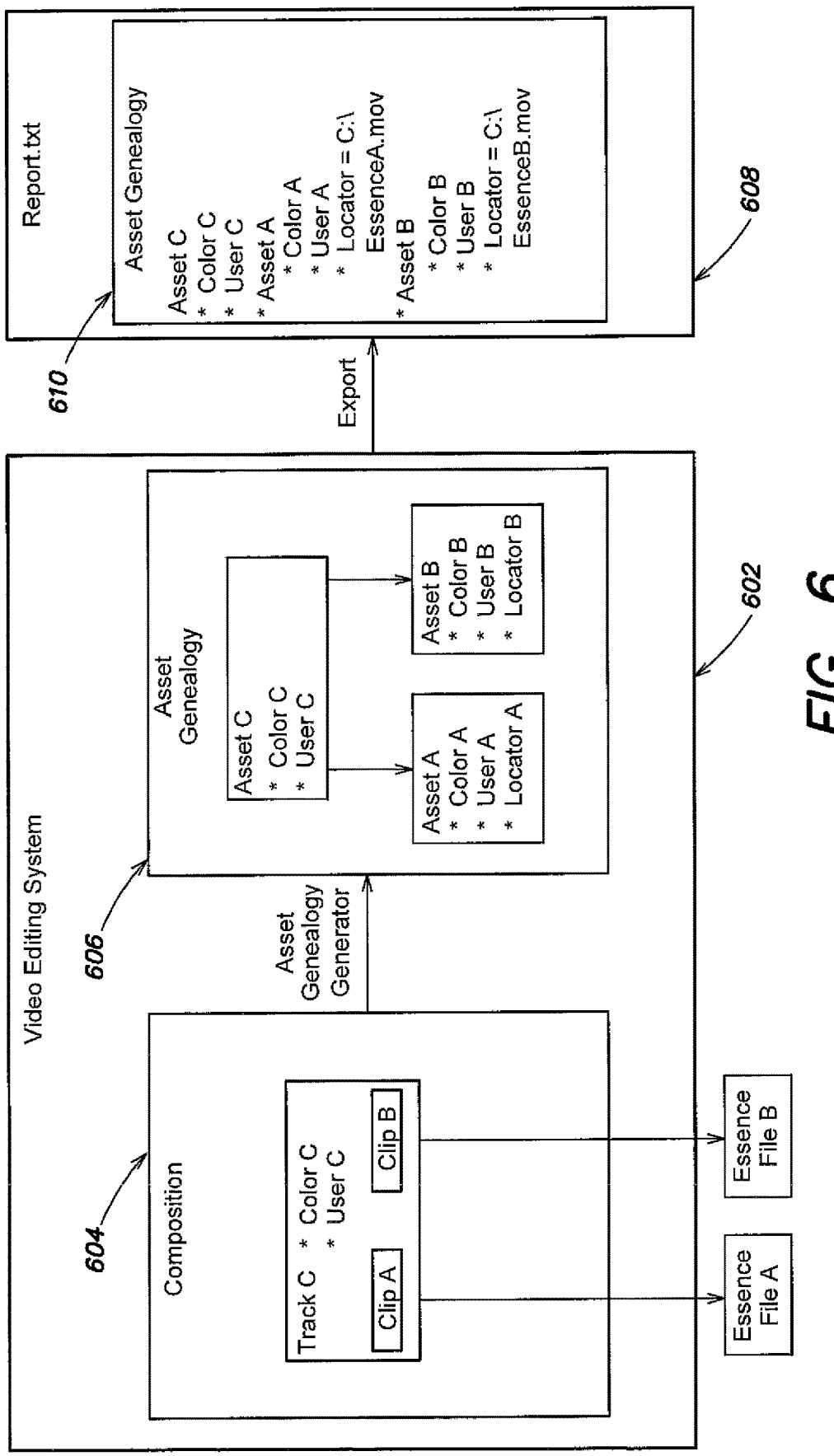
FIG. 6 illustrates generation of an asset genealogy of a video composition independent of the rendering and export of the composition.

The asset genealogy may be generated and exported as part of rendering and exporting the media composition itself or it may be generated upon request independently of any rendering and exporting of a composition. FIGS. 4 and 5 illustrate the former case and show the asset genealogy exported along with the rendered composition to media file containers 424 and 526. FIG. 6 illustrates the latter case, in which the asset genealogy of a video composition is serialized and exported from an editing system without rendering and exporting the composition itself. As shown in the figure, video editing system 602 with composition 604 and its asset genealogy 606 is exported as report text file 608 containing asset genealogy 610. Using a text-reading application to display or print the report document, the full asset contribution genealogy for composition 604 is made readily available, without requiring the use of the video editing system or any other specialized editing application.

A serialized, exported asset genealogy of a composition is stored in a generic format that is not specific to the particular editing tool that was used to create it. An example format for an exported asset genealogy is resource description framework (RDF), which supports the description of metadata relationships expressed in XML syntax or JSON. An XML document may be generated as a separate file and may be kept within a media project bundle structure. In another embodiment, a new chunk type for broadcast wave audio files may include the asset genealogy serialized into XML, similar to the way in which metadata is serialized into iXML, aXML, or XMP chunks of broadcast wave files. In MXF files, an XML asset genealogy may be serialized as a custom metadata blob. The asset genealogy may also be represented as key value pairs, or as an in-memory node tree.

An asset genealogy may be stored in any convenient location. For asset genealogies that are included within a media file container, it is stored along with the rendered composition wherever the composition itself is stored. The asset genealogy may also be stored in a separate database such as a media asset management system in which the asset genealogy may be contained within a field or referenced by a link of a database entry for the media file. In other settings, the asset genealogy may be part of a bundle that includes the media file itself, such as within a production exchange format bundle as described in U.S. Pat. No. 9,448,789, which is wholly incorporated herein by reference.

The asset genealogy may be inspected using the editing system being used to create the composition. This may be done at any stage during the editing process while the composition is within the memory of the editing system. In one implementation, the user is able to request that the editing system display the asset genealogy in a window of the graphical user interface of the editing system. The displayed asset genealogy may be updated in real time as edits are performed on the composition or may be generated upon request from a user.

Figure 7A:
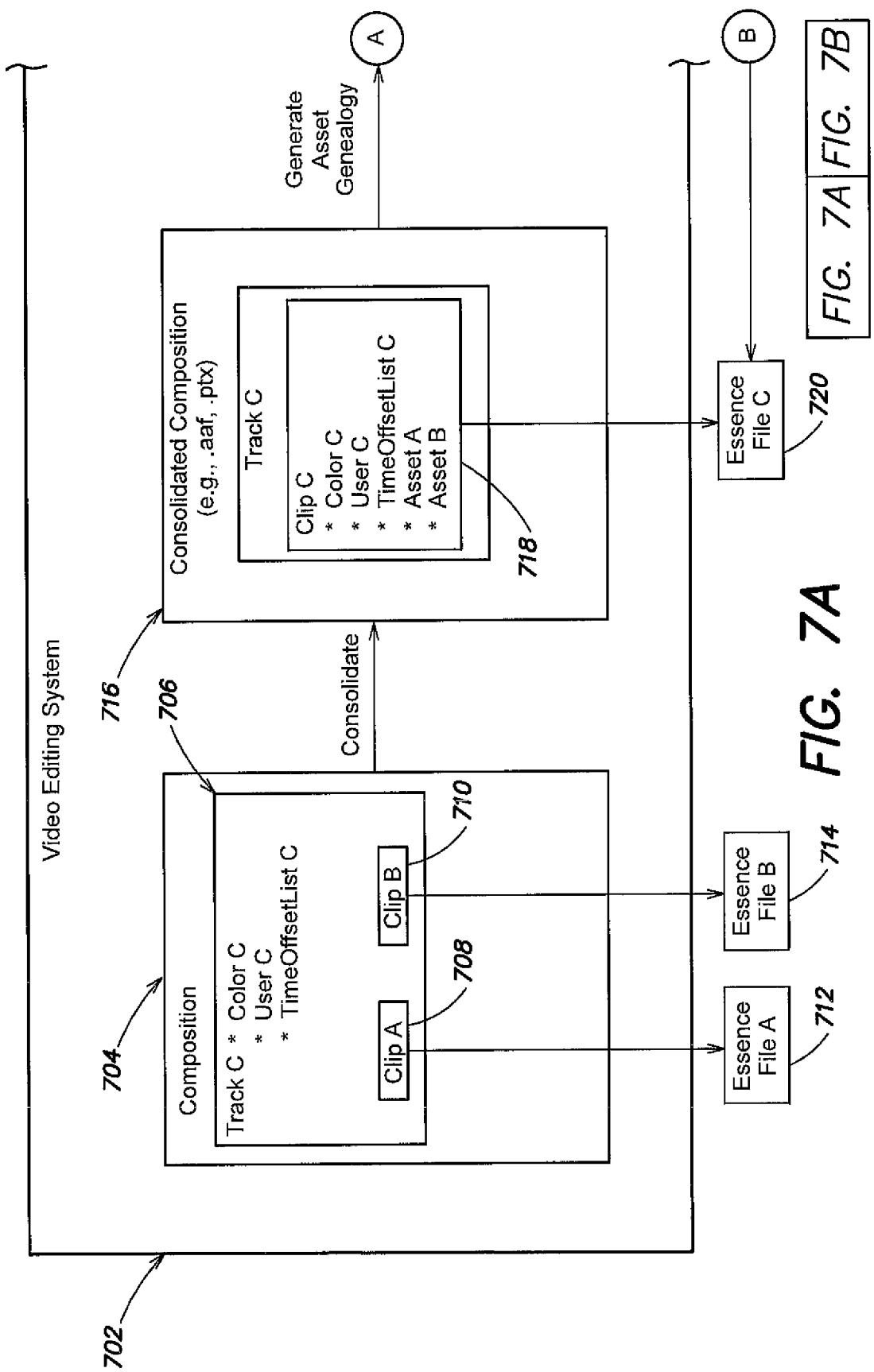
FIG. 7 illustrates the generation of an asset genealogy of a video composition following consolidation of the composition.
Figure 7B:
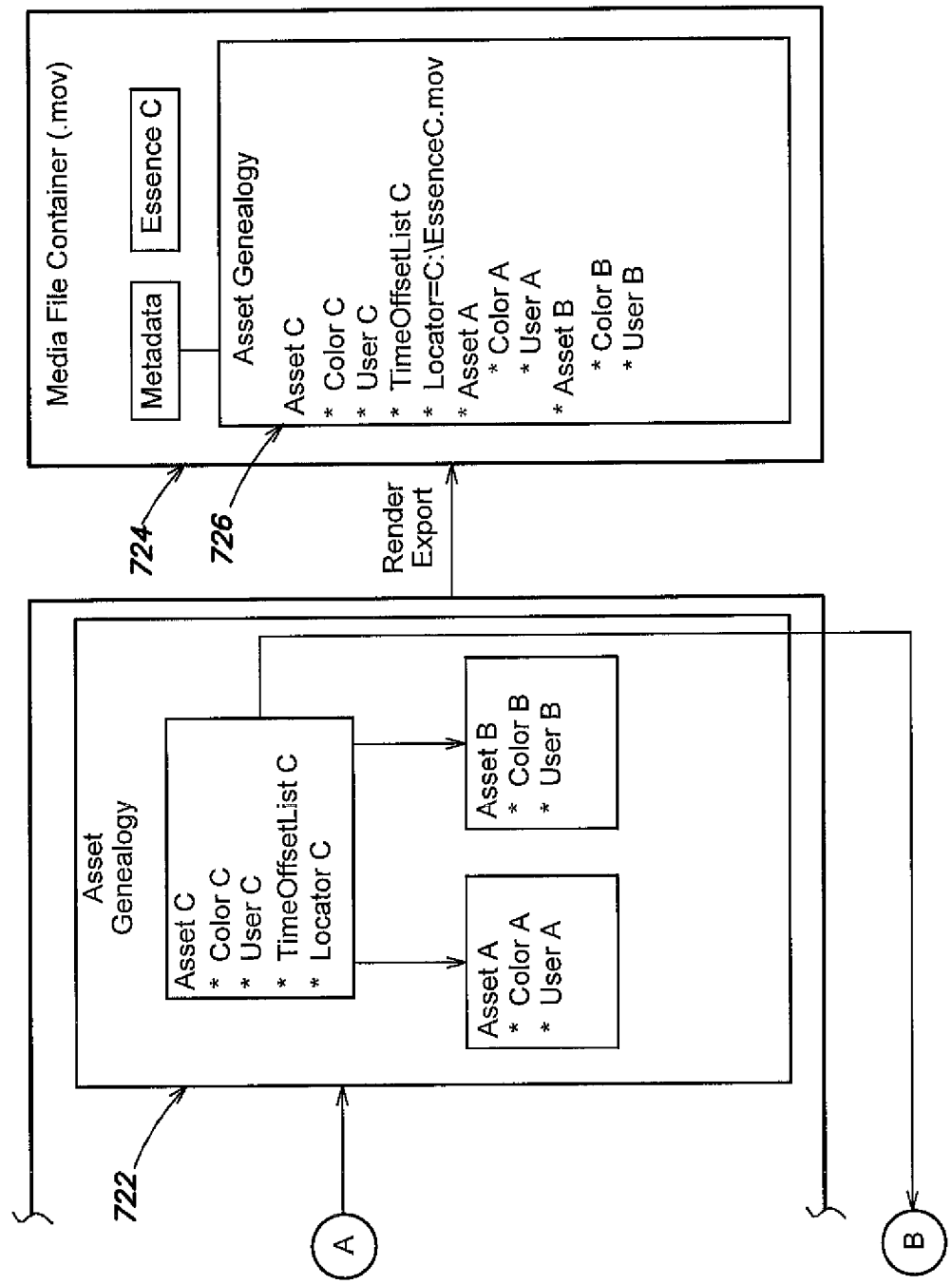

FIG. 7 illustrates the video editing of a composition and export of a media file containing an asset genealogy, similar to that shown in FIG. 4, but with a consolidation step prior to rendering and export. In contrast to the consolidation illustrated in FIG. 1C, in which information about contributing clip assets Clip A and Clip B is lost, the consolidation process described herein retains this information within the consolidated composition, while still generating an essence file comprising just the contributed portions of the clips. As before, this enables edited Track C to refer only to a single consolidated essence file and permits the removal of original essence files, thus still achieving the desired simplification of the composition and reduction in essence storage requirements. Referring to the figure, video editing system 702 is used to edit composition 704, which includes Track C 706. Track C contains Clip A 708 and Clip B 710 which refer to Essence File A 712 and Essence File B 714 respectively. The consolidation process generates consolidated composition 716, in which Clip A and Clip B are collapsed into single Clip C 718 within Track C and Essence File C 720 is generated from the contributed portions of Clips A and Clips B. However, in contrast to the prior art consolidation illustrated in FIG. 1C, Clip C includes both metadata pertaining to itself, as well as metadata documenting the assets that contribute to Clip C, i.e., Asset A corresponding to Clip A and Asset B corresponding to Clip B. Track C as well as Assets A and B each include their respective metadata (not shown). Asset genealogy 722 is generated by parsing consolidated composition 716 and includes the full hierarchical description of the composition and its contributing assets, similar to that shown in FIG. 4 (416) where no consolidation step was performed prior to asset genealogy generation. However, when the consolidation step is performed, Assets A and B may become virtual assets, as shown in asset genealogy 722, since their essence files may no longer exist or, even if they do exist, their location information may be lost. As in the case when no consolidation step is performed, asset genealogy 722 may be serialized and exported to be included within media file container 724 as asset genealogy 726. Thus, full genealogical information may be preserved through both consolidation and rendering.

Figure 8:
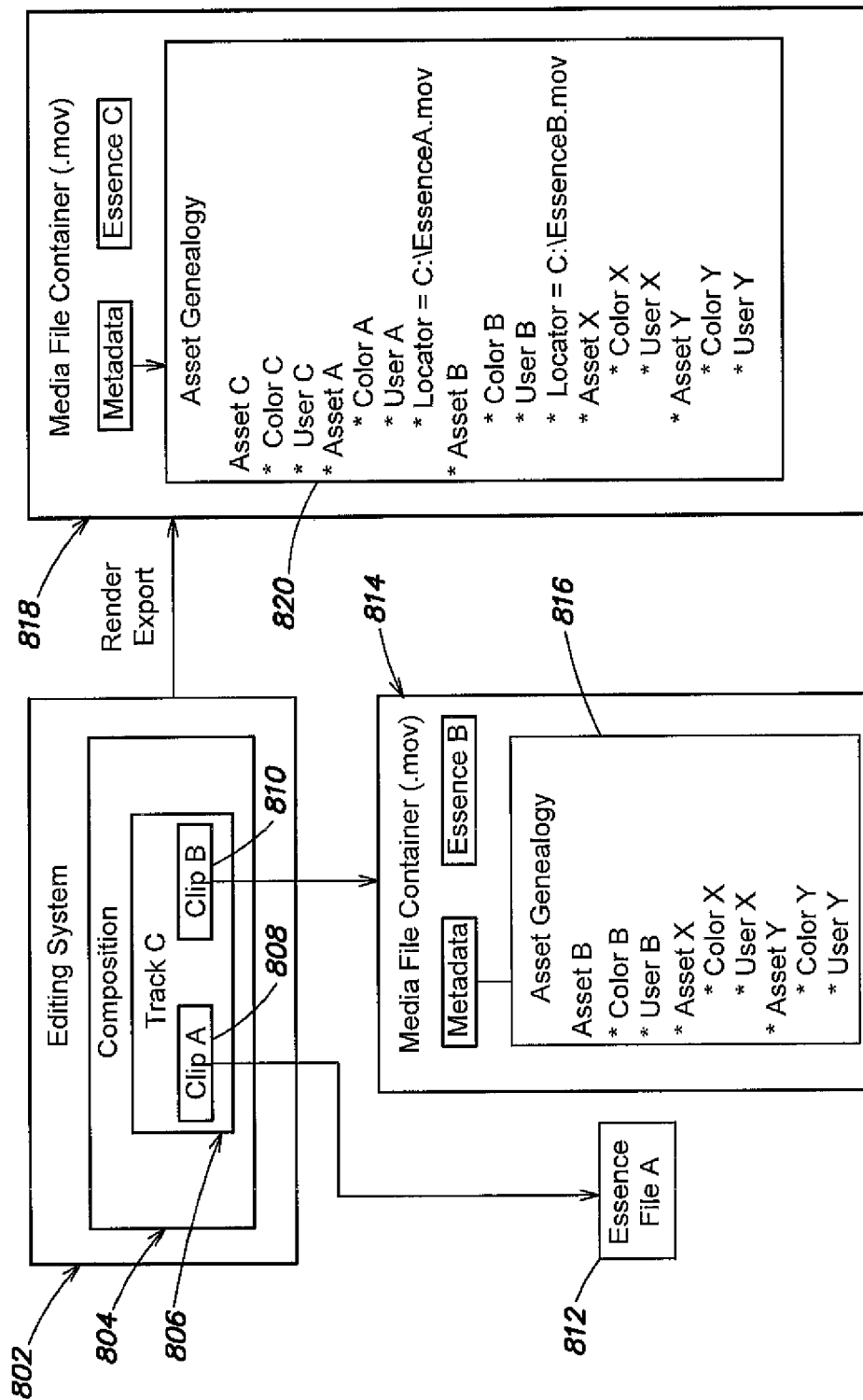
FIG. 8 illustrates the generation of an asset genealogy of a composition representing multiple generations of editing.

The genealogical history of asset contribution during the editing process is preserved through multiple generations of editing, as illustrated in FIG. 8. The figure shows a previously edited media file serving as a source that contributes to a new composition. In the scenario shown in the figure, editing system 802 includes composition 804 with top-level compositional object Track C 806. Track C contains Clip A 808 and Clip B 810. Whereas Clip A is associated simply with Essence File A 812, the essence for Clip B is the result of a previous editing process in which Clip B was created from contributing Assets X and Y. Thus Clip B references media file container 814, which includes Essence B, as well as Asset Genealogy 816, which documents the genealogy of Clip B. Asset genealogy 816 includes the metadata pertaining to Clip B, as well as metadata for Asset X and Asset Y. The locators for the essence files for Assets X and Y are no longer needed, and may have been discarded after the previous editing phase that created Clip B. However, their metadata has not been discarded, and they are retained within asset genealogy 816 as virtual assets. Following rendering and export of composition 804, media file 818 includes serialized asset genealogy 820 that documents two generations of editing, together with the essence required to play back the composition, i.e., Essence C. Asset genealogy 820 starts with metadata pertaining to top-level Asset C, i.e., Color C and User C as well as entries for the two assets from which it was created in a previous edit, i.e., Asset A and Asset B, each with their own metadata, i.e., Color A, User A, and Color B, User B. Since the locators for Asset A and Asset B are available from editing system 802, they are also available for inclusion within asset genealogy 820. Asset B includes virtual Asset X and virtual Asset Y, each with their own metadata Color X, User X, and Color Y and User Y respectively.

As indicated above, asset genealogy 820 may be parsed using a lightweight application that requires no knowledge of the editing system compositional data model used by an editing system that was used to create the media file. Thus, the media file's genealogy is readily accessed by any recipient of the asset genealogy, whether as a separate document, or contained within the media file whose genealogy it documents.

Figure 9:
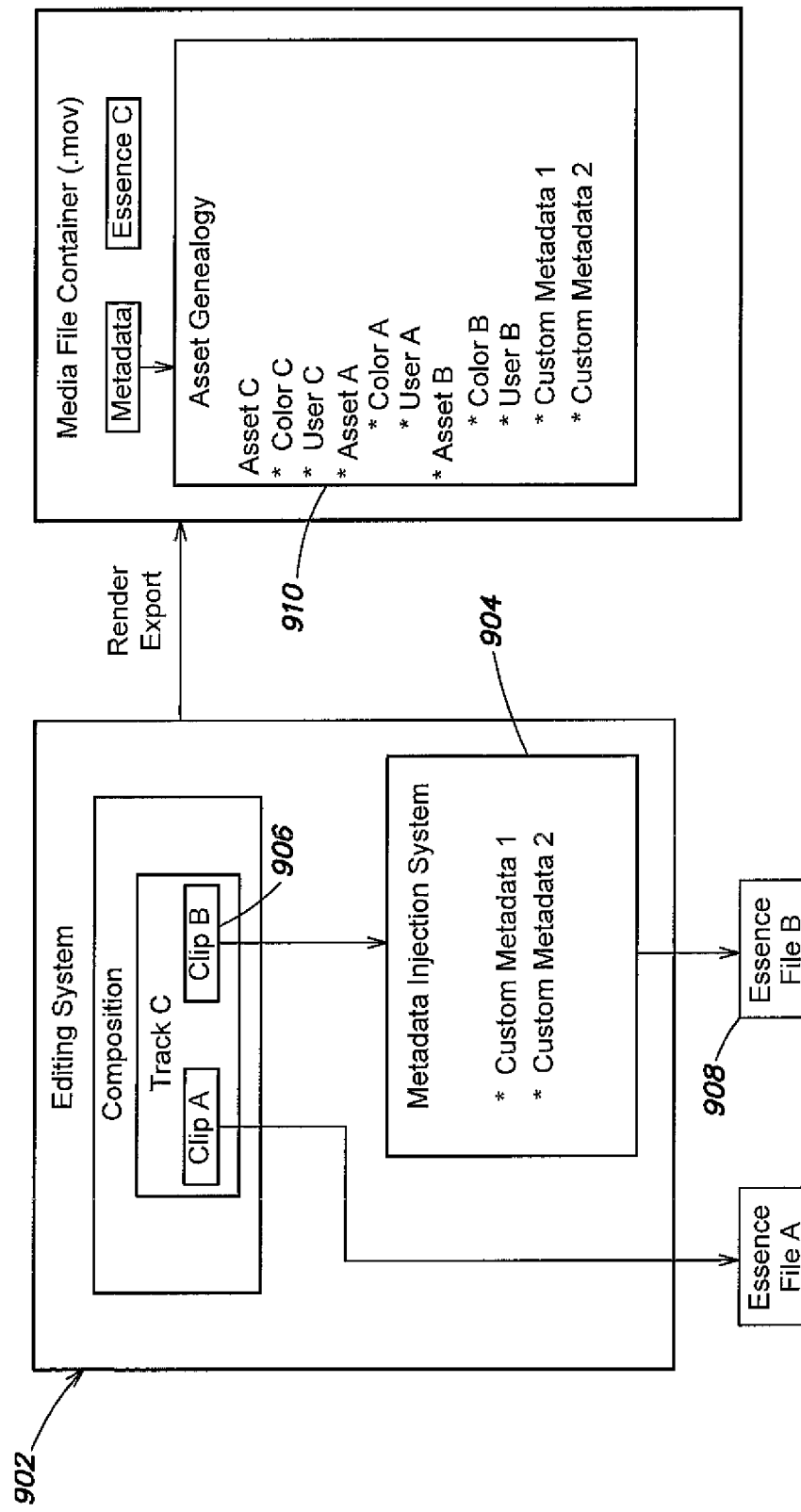
FIG. 9 illustrates the injection of custom metadata into a composition and the generation of an asset genealogy that includes the custom metadata.

The metadata that is normally included within a composition originates either from source files that contribute to the composition (e.g., from a media capture device such as a camera or an audio recording system), or from metadata that is automatically added by the editing system as part of the editing process. Both these kinds of metadata are included within the composition and can be extracted during the parsing of the composition to generate the asset genealogy. The particular metadata fields that are incorporated within the asset genealogy may be specified by a schema, as described below. In addition, a user may wish to add custom metadata of their own to a composition at any stage of the editing process, after which it too becomes available for incorporation into the asset genealogy. This process is illustrated in FIG. 9 in which editing system 902 also includes metadata injection system 904. In the example illustrated in the Figure, the user wishes to add custom metadata to Clip B 906. Via a user interface (not shown) of the metadata injection system, which may be integrated into the user interface of editing system 902, the user enters Custom Metadata 1 and Custom Metadata 2, which are added to Clip B 906. Within the data model of editing system 902, the custom metadata of Clip B appears to be associated with Essence File B 908 and therefore it is reported as part of Asset B in asset genealogy 910. By injecting custom metadata, the user can include their own tracking ID for an asset within the composition, and, via the asset genealogy, associate genealogy information with IDs that may be more meaningful to them than other asset identifiers that are automatically assigned by the editing system or capture device. The user's preferred tracking ID may correspond to other reference and registration systems, such as an ISBN number. In another use case, a user may inject an identifier for an asset so as to see whether it contributes to a composition, and if it does, to track which portion of it is contributed. Such identifiers may be input to external modules that use the surviving injected metadata and perform a lookup to identify other identifiers that reference the same asset, such as those used by a different editing tool or an asset database.

Figure 10:
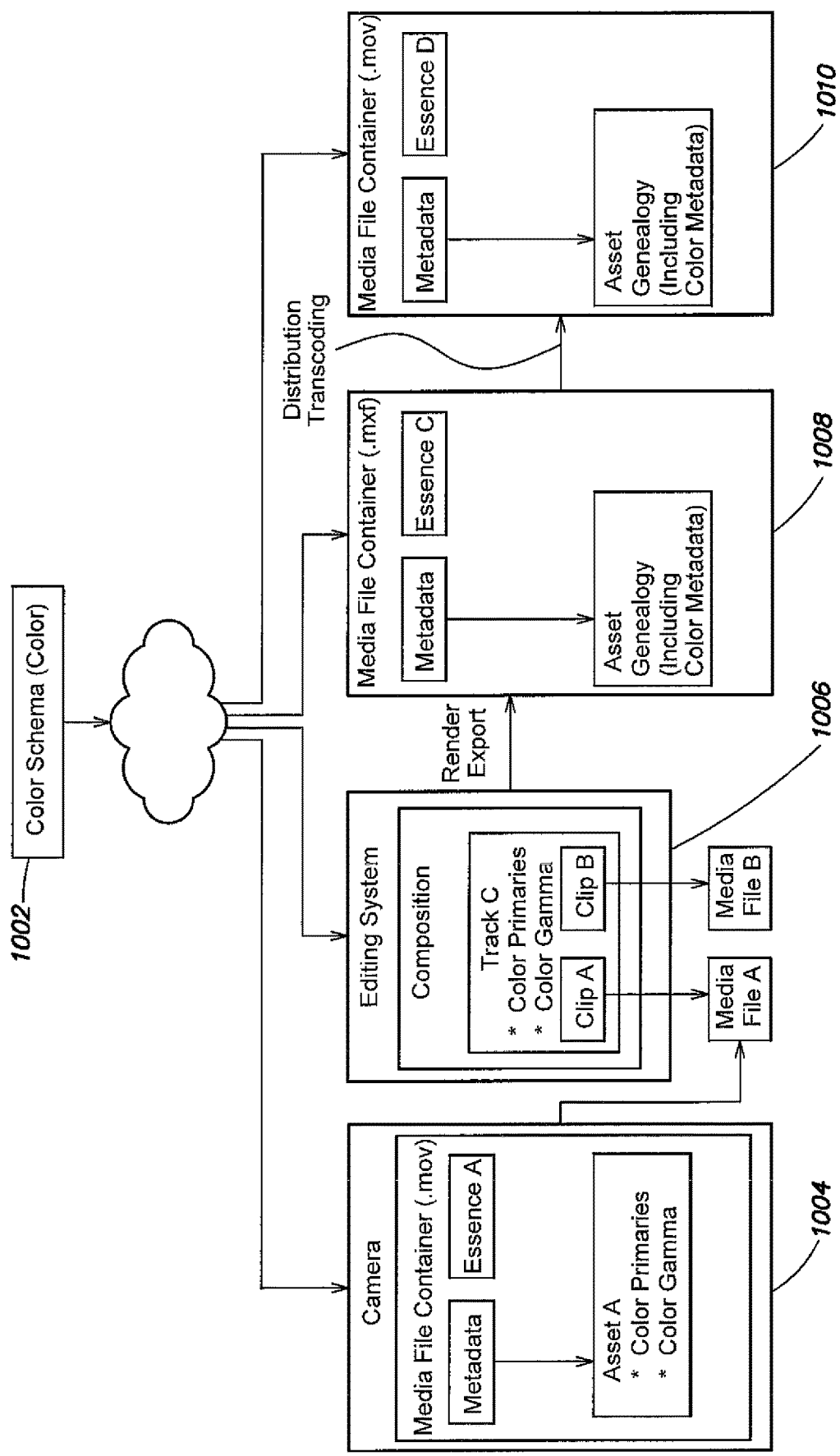
FIG. 10 illustrates the use of a schema defining metadata to be included within the media production process.

The specific metadata to be retained through media production and publishing within virtual assets may be defined by a schema, as illustrated in FIG. 10. Schemas are defined by the parties who consume asset genealogies and/or by editors and other stakeholders. In order to capture the information specified, the schema is provided to all the relevant capture devices, editing systems, and asset storage systems throughout the production pipeline. Schema 1002 is available to camera 1004 to ensure that information that may be required for a genealogy report is retained at the capture stage. The schema is also accessed by editing system 1006 and defines the nature of the information retained within the compositional objects. Similarly, the schema defines the information included within published Material Exchange Format (MXF) container 1008 and transcoded multimedia format container (MOV) 1010. In the example shown in FIG. 10, Color Schema (Color) 1002 specifies what color information is required, and this is reflected in the metadata associated with the source assets, the compositional objects, and the assets appearing within the genealogy in the exported media files. The Color Schema also defines how a particular media file, such as an MXF or a DPX file represents colors within the media. Color schema parameters include but are not limited to the choice of color space, the color model, values for the primary colors and reference white and reference black, and the encoding optical transfer function (EOTF). Other types of schemas may specify, for example, that rights, location, or talent information be retained through the media production workflow.

Figure 11:
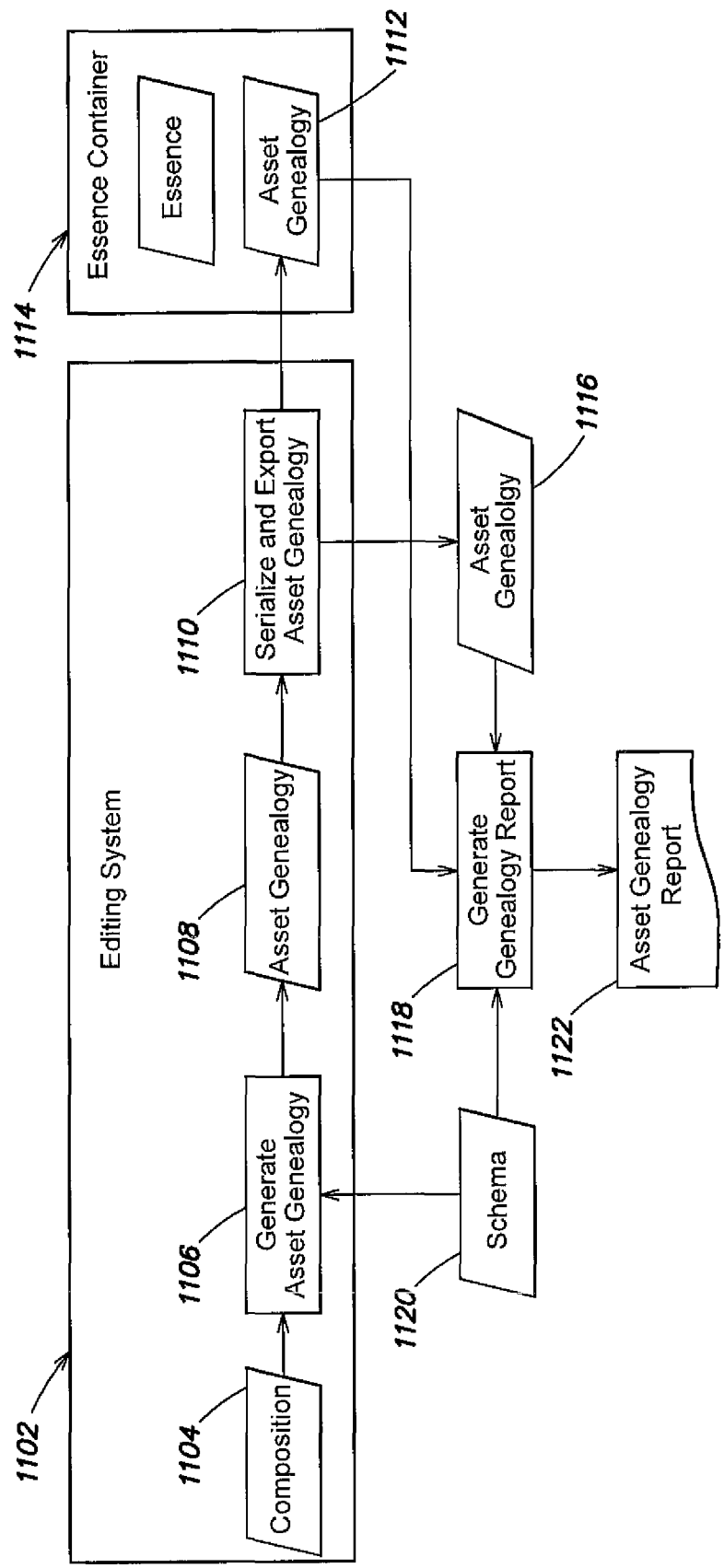
FIG. 11 is a high-level flow diagram illustrating the generation of an asset genealogy report.

As discussed above, an asset genealogy may be generated as part of the rendering and exporting of a composition when it is placed within the essence container of the rendered composition (FIGS. 4 and 5) or it may be generated separately from exporting and rendering the composition when it is exported as a separate object (FIG. 6). The asset genealogy is then used as the basis from which an asset genealogy report is generated. The content of the report may include all the data captured in the asset genealogy. However, in typical use cases, the person for whom the report is generated is interested in a specific aspect of the asset genealogy, such as performance rights for a certain territory, or the role of certain talent featured in the composition. The corresponding flow diagram is shown in FIG. 11. When an asset genealogy is to be generated, editing system 1102 executes process 1106 that traverses composition 1104, as discussed above, extracting the metadata for the contributing compositional objects and placing them into asset genealogy 1108. The process of generating the asset genealogy may be performed by a module of editing system 1102. For a time-based media editing system such as a non-linear video editor or a digital audio workstation, process 1106 is executed by a built-in software module of the editing application, or by a third-party software plug-in module. Asset genealogy 1108, located within the editing system, is serialized and exported (process 1110) either as part of the rendering and exporting of the composition, or independently of it. In the former case, serialized asset genealogy 1112 is inserted into essence container 1114 together with the rendered composition. In the latter case, it is exported to separate file 1116, which is stored on the same system hosting editing system 1102, or in shared local or remote external storage. To generate an asset genealogy report (process 1118), an application reads the asset genealogy and generates the report in the desired format. In various embodiments, the content of the report is specified by schema 1120, which may be the same as schema 1002 shown in FIG. 10 or may be a separate object. The report generation is performed by a lightweight application that reads the serialized asset genealogy and the schema. In some embodiments the serialized asset genealogy is available to editing system 1102 and the report generation is implemented by a module of media editing system 1102. The output of the report generating process is asset genealogy report 1122, which is output and stored as a document in text, XWL, or another document format.

A specific report that is of importance to recipients of a rendered composition is a detailed inventory of ownership for each asset consumed. The report may specify the temporal duration and temporal location of the consumed portion within the source asset as well as its temporal location in the published media composition. Such a report may be required to ensure proper attribution for all contributors to the media composition. The report may include details of the distribution rights available for each asset, any royalty payments that may be required, and usage restrictions, such as to specific territories, or to specific venues. Other aspects that may be tracked and reported on include product placement, actor compensation, and suitability of language for various venues.

While the discussion above has focused principally on generating genealogies for media compositions having assets such as video, audio, graphics, and graphics procedural methods, the described methods may equally be applied to the output from other types of digital editing applications, such as a word processor or a spreadsheet application. As with media editing systems, such applications each represent their compositions in an editing application-specific representation, such as a specific document format for a word processor and a specific workbook format for a spreadsheet application. The output of such applications is an essence container that contains a corresponding type of content stream. The container includes metadata that describes the essence and the essence itself. The methods described herein address the problem of preserving the genealogy of the assets that contribute to the composition that would normally be lost during the course of the compositional process.

The various components of the system described herein may be implemented as a computer program using one or more general-purpose computer systems. Such computer systems typically include a main unit connected to both an output device that displays information to a user and an input device that receives input from a user. The main unit generally includes a processor connected to a memory system via an interconnection mechanism. The input device and output device also are connected to the processor and memory system via the interconnection mechanism.

One or more output devices may be connected to each computer system. Example output devices include, but are not limited to, liquid crystal displays (LCD), plasma displays, various stereoscopic displays including displays requiring viewer glasses and glasses-free displays, cathode ray tubes, video projection systems and other video output devices, printers, devices for communicating over a low or high bandwidth network, including network interface devices, cable modems, and storage devices such as disk or tape. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer systems may be general purpose computer systems, which are programmable using a computer programming language, a scripting language or even assembly language. The computer systems may also include specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks, or cloud storage.

A system such as described herein may be implemented in software, hardware, firmware, or a combination of the three. The various elements of the system, either individually or in combination may be implemented as one or more computer program products in which computer program instructions are stored on a computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network, or the computing resources executing the process may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method of generating a hierarchical asset genealogy of a media composition, the method comprising:

accessing the media composition, wherein the media composition is represented by a first plurality of media assets that contribute to the media composition;

traversing the media composition to identify contributing media assets, and for each asset of the first plurality of media assets that contribute to the media composition, extracting metadata pertaining to the media asset and writing the extracted metadata into the hierarchical asset genealogy, wherein:

at least one previously edited asset of the first plurality of media assets includes metadata pertaining to a second plurality of media assets that contribute to the at least one previously edited asset; and writing the extracted metadata into the hierarchical asset genealogy includes writing the metadata of each asset of the second plurality of media assets into the hierarchical asset genealogy at a level below a level at which metadata pertaining to the at least one previously edited asset of the first plurality of assets is written;

serializing the hierarchical asset genealogy; and
exporting the serialized asset genealogy to a file.

2. The method of claim 1, wherein the file is in one of a text format and an XML format.

3. The method of claim 1, wherein a reporting application reads the file containing the serialized asset genealogy and outputs an asset genealogy report document that includes information derived from a subset of the serialized asset genealogy in accordance with a schema accessed by the reporting application.

4. The method of claim 1 further comprising:
rendering the media composition; and
exporting the rendered media composition and the serialized asset genealogy to a media file.

5. The method of claim 1, wherein the metadata pertaining to at least one of the second plurality of media assets does not include a locator that references an essence file, and wherein the at least one of the second plurality of media assets is represented in the asset genealogy as a virtual asset that does not include a locator that references an essence file.

6. The method of claim 1, wherein the metadata pertaining to at least one of the second plurality of media assets includes a locator that references an essence file, and wherein the at least one of the second plurality of media assets is represented in the asset genealogy as a physical asset that includes the locator that references the essence file.

7. The method of claim 6, wherein the locator is one of a uniform resource locator and a media asset identifier.

8. The method of claim 1, wherein at least one of:
an asset of the first plurality of assets includes custom metadata that was added to the asset by a user of the media editing system and extracting and writing metadata of the asset into the hierarchical asset genealogy includes extracting and writing the custom metadata into the hierarchical asset genealogy; and
an asset of the second plurality of assets includes custom metadata that was added to the asset by a user of the media editing system and extracting and writing metadata of the asset into the hierarchical asset genealogy includes extracting and writing the custom metadata into the hierarchical asset genealogy.

9. The method of claim 1, wherein the metadata extracted from each of the first plurality of assets and the second plurality of assets includes metadata of a predetermined type, wherein the type is specified by a schema received by the media editing system.

10. The method of claim 9, wherein the predetermined type includes usage rights for the asset to which the metadata pertains.

11. The method of claim 9, wherein the predetermined type includes ownership of the asset to which the metadata pertains.

12. The method of claim 1, wherein a media asset of the first plurality of media assets was captured by a device, and a type of metadata pertaining to the captured media asset was specified by a schema accessed by the device.

13. The method of claim 1, wherein the media composition is a time-based media composition, and the metadata extracted and written into the hierarchical asset genealogy includes data defining a temporal portion of an asset that contributes to the media composition.

14. The method of claim 13, wherein the media editing system consolidates the media composition prior to the generation of the hierarchical asset genealogy, the consolidation including:

extracting contributing portions of essence referenced by a plurality of assets that contribute to the media composition and writing the extracted portions into a consolidated essence file; and
copying into the media composition metadata pertaining to each of the plurality of assets that contribute to the media composition.

15. The method of claim 1, wherein at least one of the first plurality of media assets and the second plurality of media assets include a procedurally defined graphical object, and the metadata extracted and written into the hierarchical asset genealogy includes data defining a spatial location of the procedurally defined graphical object within the media composition.

16. The method of claim 1, wherein at least one of the first plurality of media assets and the second plurality of media assets include a software procedural generator.

17. The method of claim 16, wherein the software procedural generator, when executed by the media composition system, generates at least one of an audio signal, a color value, and a color tone bar.

18. A computer program product comprising:
a non-transitory computer-readable medium with computer program instructions encoded thereon, wherein the computer program instructions, when processed by a media editing system, instruct the media editing system to generate a hierarchical asset genealogy of a media composition, the method comprising:
accessing the media composition, wherein the media composition is represented by a first plurality of media assets that contribute to the media composition;
traversing the media composition to identify contributing media assets, and for each asset of the first plurality of media assets that contribute to the media composition, extracting metadata pertaining to the media asset and writing the extracted metadata into the hierarchical asset genealogy, wherein:
at least one previously edited asset of the first plurality of media assets includes metadata pertaining to a second plurality of media assets that contribute to the at least one previously edited asset; and
writing the extracted metadata into the hierarchical asset genealogy includes writing the metadata of each asset of the second plurality of media assets into the hierarchical asset genealogy at a level below a level at which metadata pertaining to the at least one previously edited asset of the first plurality of assets is written;
serializing the hierarchical asset genealogy; and
exporting the serialized asset genealogy to a file.

19. A media editing system comprising:
a memory for storing computer-readable instructions; and
a processor connected to the memory, wherein the processor, when executing the computer-readable instructions, causes the media editing system to perform a method of generating a hierarchical asset genealogy of a media composition, the method comprising:
accessing the media composition, wherein the media composition is represented by a first plurality of media assets that contribute to the media composition;
traversing the media composition to identify contributing media assets, and for each asset of the first plurality of media assets that contribute to the media composition, extracting metadata pertaining to the media asset and writing the extracted metadata into the hierarchical asset genealogy, wherein:
  at least one previously edited asset of the first plurality of media assets includes metadata pertaining to a second plurality of media assets that contribute to the at least one previously edited asset; and
writing the extracted metadata into the hierarchical asset genealogy includes writing the metadata of each asset of the second plurality of media assets into the hierarchical asset genealogy at a level below a level at which metadata pertaining to the at least one previously edited asset of the first plurality of assets is written;
serializing the hierarchical asset genealogy; and
exporting the serialized asset genealogy to a file.

* * * * *